United States Patent [19]
Alatalo et al.

[11] Patent Number: 5,555,245
[45] Date of Patent: Sep. 10, 1996

[54] METHOD FOR IMPLEMENTING TIME SWITCHING AND A TIME SWITCH

[75] Inventors: Hannu Alatalo; Marko Kokko, both of Oulu, Finland

[73] Assignee: Nokia Telecommunications Oy, Espoo, Finland

[21] Appl. No.: 374,522

[22] PCT Filed: Jul. 8, 1993

[86] PCT No.: PCT/FI93/00290

§ 371 Date: Mar. 7, 1995

§ 102(e) Date: Mar. 7, 1995

[87] PCT Pub. No.: WO94/03022

PCT Pub. Date: Feb. 3, 1994

[30] Foreign Application Priority Data

Jul. 17, 1992 [FI] Finland ................................ 923296

[51] Int. Cl.⁶ ..................................................... H04Q 11/04
[52] U.S. Cl. ................................................ 370/66; 370/68
[58] Field of Search ............................... 370/58.1, 58.2, 370/58.3, 60, 60.1, 66, 68, 94.1, 94.2, 100.1, 102, 105.1, 105.3, 108

[56] References Cited

U.S. PATENT DOCUMENTS

| | | | |
|---|---|---|---|
| 4,471,479 | 9/1984 | Waas | 370/66 |
| 5,197,063 | 3/1993 | Nakano et al. | 370/58.1 |
| 5,311,506 | 5/1994 | Beisel | 370/58.1 |
| 5,351,238 | 9/1994 | Ashi et al. | 370/66 |
| 5,416,772 | 5/1995 | Helton et al. | 370/66 |

FOREIGN PATENT DOCUMENTS

| | | |
|---|---|---|
| 406191 | 1/1991 | European Pat. Off. . |
| 923297 | 2/1994 | Finland . |
| 923295 | 2/1994 | Finland . |
| 3214891 | 9/1991 | Japan . |
| 2254754 | 10/1992 | United Kingdom . |

*Primary Examiner*—Alpus H. Hsu
*Attorney, Agent, or Firm*—Cushman, Darby & Cushman, L.L.P.

[57] ABSTRACT

A method for implementing time switching, and to a time switch. The contents of the time slots of an incoming signal are written into a memory at a memory location determined by a write address and read from said memory at the memory locations indicated by the switching data contained in an address control memory. With the aim of simplifying known solutions, the switching data of each time slot is given as a relative address which indicates the location difference within the frame structure between an outgoing time slot and an incoming time slot to be connected thereto.

4 Claims, 4 Drawing Sheets

METHOD FOR IMPLEMENTING TIME SWITCHING AND A TIME SWITCH

BACKGROUND OF THE INVENTION

The invention relates to a method for implementing time switching, and to a time switch.

In this connection, time switch refers to a device capable of switching the contents of any time slot in the frame structure of an incoming signal to any time slot in an outgoing frame structure. In addition to a time switch, this device can also be called a time slot interchanger.

Cross-connection of a TDM (Time Division Multiplex) signal is effected in a time switch comprising a connection memory into which the contents of incoming time slots are written, and on the one hand, means for controlling writing into the memory, and on the other other hand, means for controlling reading from the memory. Switching data is stored in an address control memory of the time switch, the memory locations of which are read cyclically—one memory location per each outgoing time slot. The contents of a memory location indicate that memory location of the connection memory from which the information is read.

In known solutions, switching data consists of the absolute address of a time slot, i.e. that time slot of an outgoing signal which is outgoing at that particular moment is given the number of the incoming time slot the contents of which are to be switched to the outgoing time slot.

The known solutions have the drawback of making the equipment fairly complicated.

SUMMARY OF THE INVENTION

The object of the present invention is to remedy the above-mentioned drawback.

The idea of the invention is to indicate the read address necessary for reading from the memory as a relative transition occurring within the frame structure.

The solution of the invention renders it possible to implement a time switch in a more simplified manner than before. As a result of the simplification of hardware, the delay caused by it is shorter, which leads to improved reliability of operation.

BRIEF DESCRIPTION OF THE DRAWINGS

In the following, the invention will be described in more detail with reference to the examples based on the STM-1 signal and set forth in the accompanying drawings, in which.

DETAILED DESCRIPTION

Figure 1:
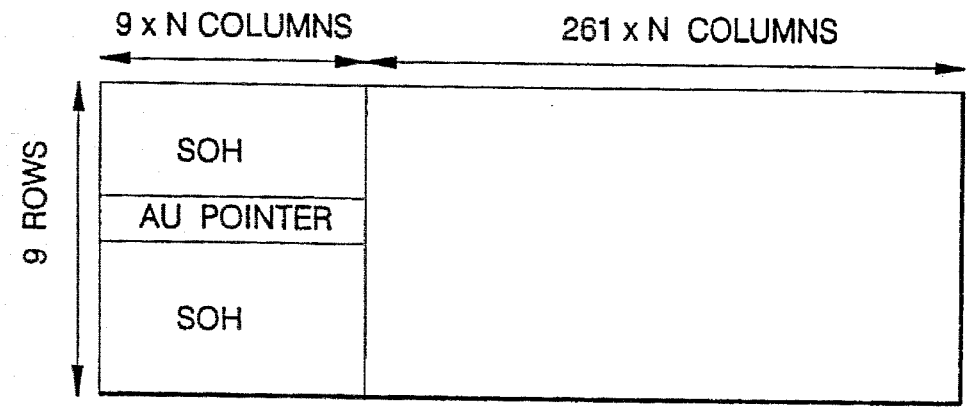
FIG. 1 shows the basic structure of a single STM-N frame.
Figure 2:
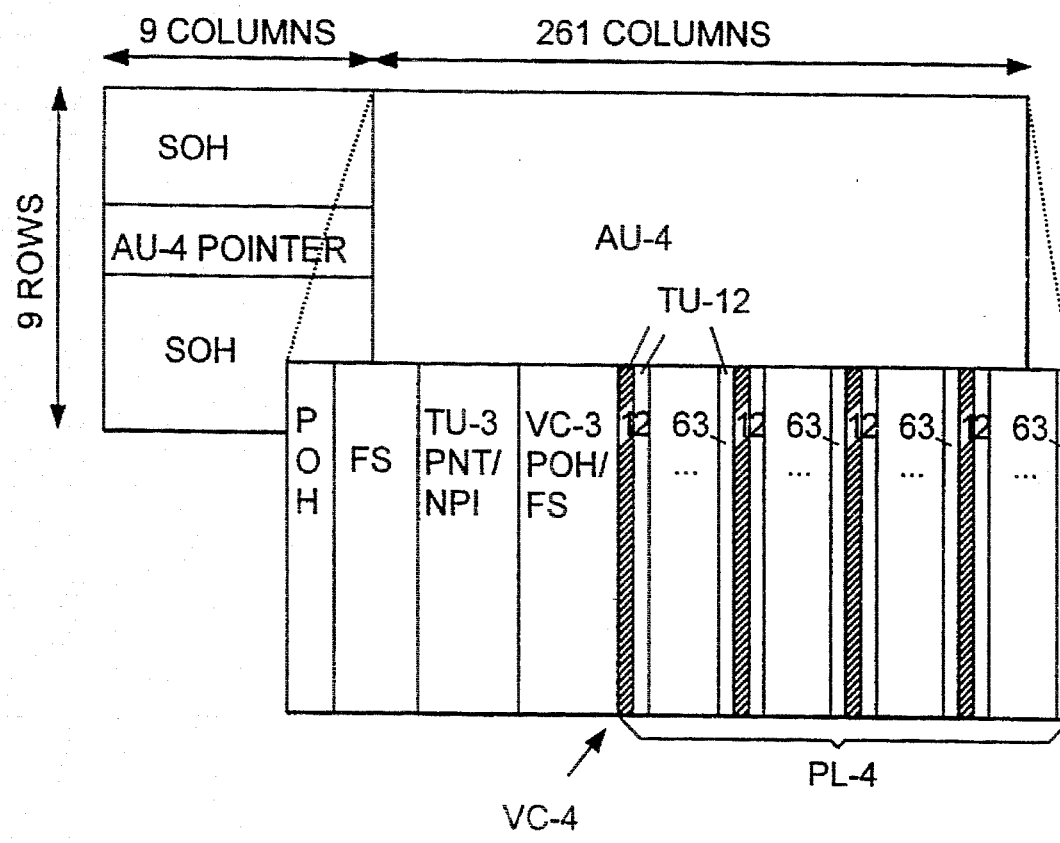
FIG. 2 shows the structure of a single STM-1 frame.

FIG. 1 illustrates the structure of an STM-N frame used in the Sychronous Digital Hierarchy (SDH) network, and FIG. 2 illustrates a single STM-1 frame. The STM-N frame comprises a matrix with 9 rows and N×270 columns so that there is one byte at the junction point between each row and the column. Rows 1–3 and rows 5–9 of the N×9 first columns comprise a section overhead SOH, and row 4 comprises an AU pointer. The rest of the frame structure is formed of a section having the length of N×261 columns and containing the payload section of the STM-N frame.

FIG. 2 illustrates a single STM-1 frame which is 270 bytes in length, as described above. The payload section comprises one or more administration units AU. In the example shown in the figure, the payload section consists of the administration unit AU-4, into which a highest-level virtual container VC-4 is inserted. (Alternatively, the STM-1 transfer frame may contain three AU-3 units, each containing a corresponding lower-level virtual container VC-3). The VC-4 in turn consists of a path overhead POH located at the beginning of each row and having the length of one byte (9 bytes altogether), fixed stuff FS located at the following two columns, TU-3 pointers or a null pointer indicator NPI located at the following three columns, fixed stuff or VC-3 path overheads (VC-3 POH) located at the following three columns, and the actual payload section PL. The null pointer indicator NPI is used to separate the tributary unit groups TUG-3 comprising TU-3 units from the tributary unit groups TUG-3 comprising TU-2 units.

Figure 3:
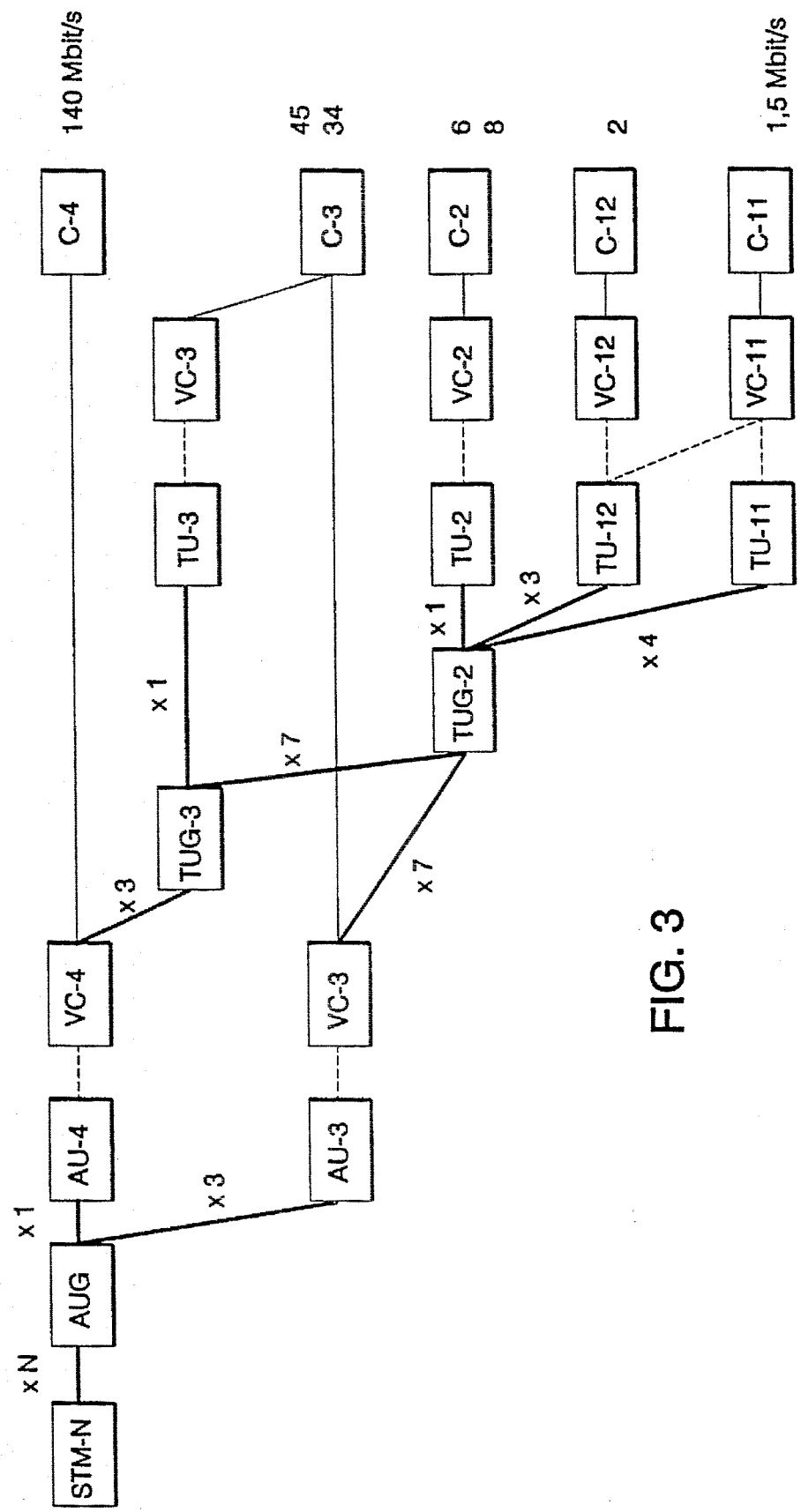
FIG. 3 shows the assembly of the STM-N frame from existing PCM systems.

FIG. 3 shows how the STM-N frame can be formed of existing bit streams. These bit streams (1.5, 2, 6, 8, 34, 45 or 140 Mbit/s, shown on the right in the figure) are packed at the first stage into containers C specified by CCITT. At the second stage, overhead bytes containing control data are inserted into the containers, thus obtaining the above-described virtual container VC-11, VC-12, VC-2, VC-3 or VC-4 (the first suffix in the abbreviations represents the level of hierarchy and the second suffix represents the bit rate). This virtual container remains intact while it passes through the synchronous network up to its point of delivery. Depending on the level of hierarchy, the virtual containers are further formed either into so-called tributary units TU or into AU units (AU-3 and AU-4) already mentioned above by providing them with pointers. The AU unit can be mapped directly into the STM-1 frame, whereas the TU units have to be assembled through tributary unit groups TUG and VC-3 and VC-4 units to form AU units which then can be mapped into the STM-1 frame. In FIG. 3, the mapping is indicated by a continuous thin line, the aligning with a broken line, and the multiplexing with a continuous thicker line.

As is to be seen from FIG. 3, the STM-1 frame may be assembled in a number of alternative ways, and the content of the highest-level virtual container VC-4, for instance, may vary, depending on the level from which the assembly has been started and in which way the assembly has been performed. The STM-1 signal may thus contain e.g. 3 TU-3 units or 21 TU-2 units or 63 TU-12 units (or an arbitrary combination of some of the above-mentioned units). As the higher-level unit contains several lower-level units, e.g. the VC-4 unit contains TU-12 units (there are 63 such units in a single VC-4 unit, cf. FIG. 3), the lower-level units are mapped into the higher-level frame by interleaving so that the first bytes are first taken consecutively from each one of the lower-level units, then the second bytes, etc. Accordingly, when the VC-4 signal contains e.g. the above-mentioned 63 TU-12 signals, these signals are located in the VC-4 frame as shown in FIG. 2, i.e. the first byte of the first TU-12 signal is located first, then the first byte of the second TU-12 signal, etc. After the first byte of the last signal, i.e. the 63rd TU-12 signal, the second byte of the first TU-12 signal follows, etc.

The following table shows the contents of the columns of the STM-1 frame as a summary, depending on whether the frame contains TU-12, TU-2 or TU-3 units.

| Column Number | TU-12 | TU-2 | TU-3 |
|---|---|---|---|
| 1–9 | SOH | SOH | SOH |
| 10 | VC-4 POH | VC-4 POH | VC-4 POH |
| 11–12 | fixed stuff | fixed stuff | fixed stuff |
| 13–15 | NPI | NPI | TU-3 pointers |
| 16–18 | fixed stuff | fixed stuff | VC-3 POH |
| 19–81 | 1 × 63 × TU-12 | 3 × 21 × TU-2 | 21 × 3 × TU-3 |
| 82–144 | 1 × 63 × TU-12 | 3 × 21 × TU-2 | 21 × 3 × TU-3 |
| 145–207 | 1 × 63 × TU-12 | 3 × 21 × TU-2 | 21 × 3 × TU-3 |
| 208–270 | 1 × 63 × TU-12 | 3 × 21 × TU-2 | 21 × 3 × TU-3 |

The SDH system is described more closely e.g. in References [1] to [3] (the references are listed at the end of the specification).

Figure 4:
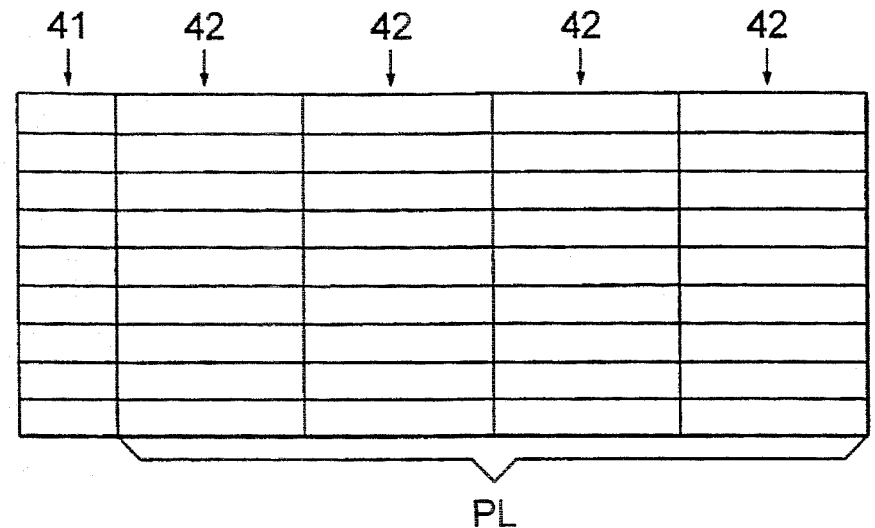
FIG. 4 shows an STM-1 frame and blocks of different sizes contained in it.

On the basis of the above, the frame of the STM-1 signal can be illustrated with respect to the switching as shown in FIG. 4. It consists of blocks of two types: e.g. the first 18 bytes, consisting of section and path overheads, on each row form the first block 41, and the following 63 bytes on each row form the second block 42, of which there are four successive ones in a single STM-1 frame 4. The data contained in the first block is not cross-connected (except for columns 13 to 18 in the case of TU-3 signals), but it continues in the same time slots even in the outgoing frame.

Figure 5:
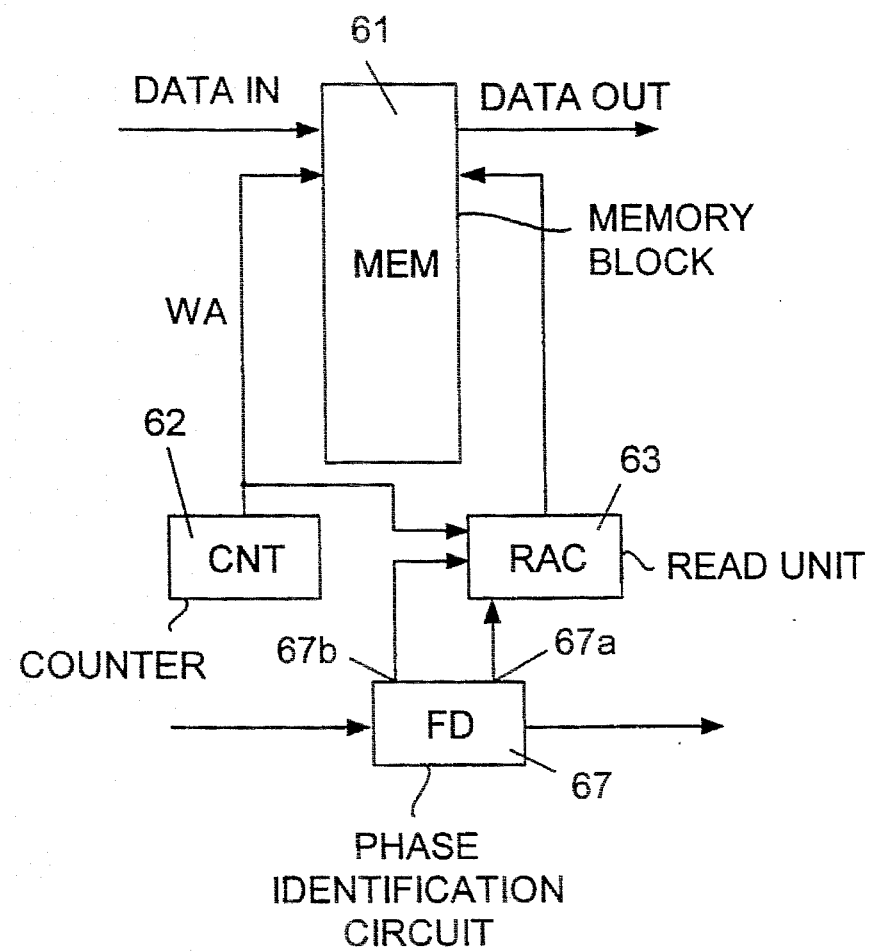
FIG. 5 shows a time switch of the invention and implementation of time switching.
Figure 6:
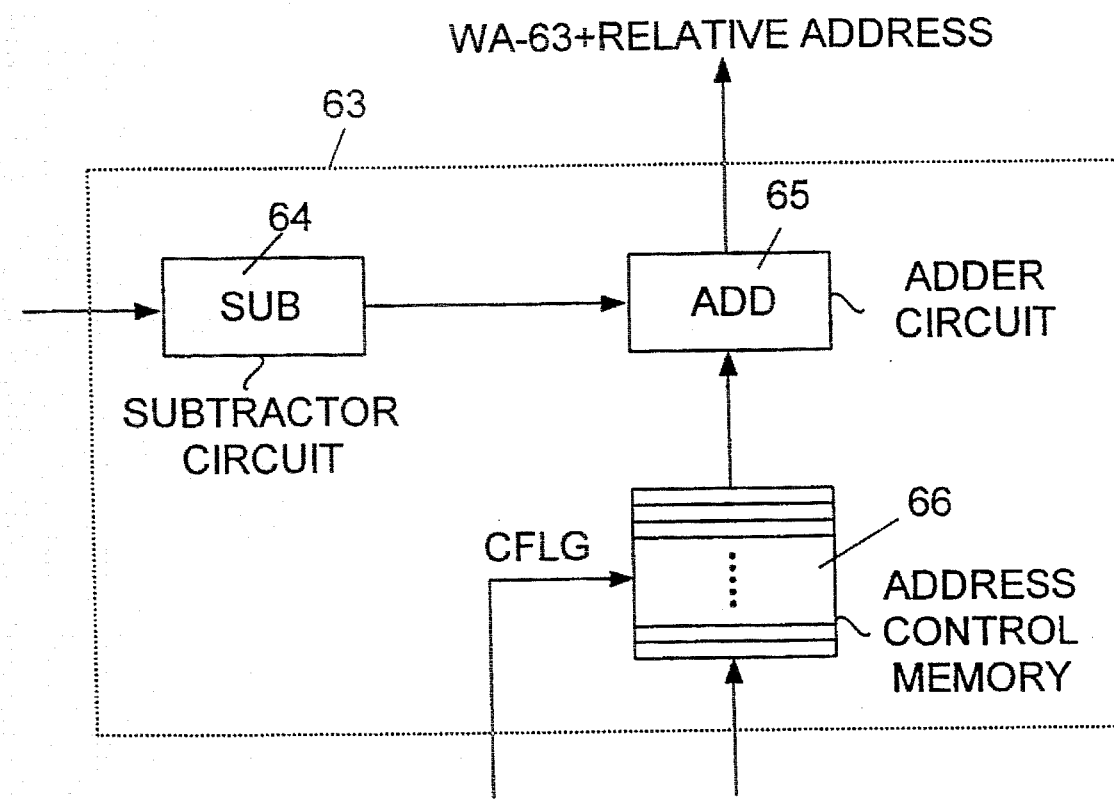
FIG. 6 shows a more detailed view of the read unit of the time switch shown in FIG. 6.

FIGS. 5 and 6 illustrate a solution of the invention for implementing time switching. FIG. 5 is a block diagram of the whole structure, and FIG. 6 is a more detailed view of the read unit 63 shown in FIG. 5. As regards the connection memory and writing into it, the time switch according to this example is the object of Finnish Patent Application No. 923295, filed Jul. 17, 1992, which corresponds to U.S. patent application Ser. No. 08/367,269, filed Mar. 15, 1995. The relative indication according to the invention is to be preferred in a time switch with this structure, as it allows the structure of the equipment to be as simple as possible. However, the solution of the invention can also be used in time switches of the prior art, which are described in greater detail. e.g. in the above-mentioned Finnish application.

The time switch (FIG. 5) comprises only one memory block 61, which is twice as large as the largest frame block. In this case the size of the memory block 61 is thus 126 bytes. Writing into the memory is controlled by a simple counter 62, which is not in synchronization with the incoming signal frame (but is in synchronization with the clock signal), and which counts continuously from 1 to 126. The bytes of an incoming signal containing frame blocks of different sizes are written continuously into the memory at the address WA given by the counter, said address being incremented by one for each byte. The writing is effected without synchronization with the incoming signal frame, i.e. starting from an arbitrary location in the frame.

The write address WA given by the counter 62 is also supplied to a read unit 63, more specifically to a subtractor circuit 64 therein (FIG. 6), which generates the delay by subtracting the value 63 from the write address (in this case the cross-connection delay has the length of 63 bytes, and in general it is as long as the duration of the largest frame block in bytes). The read address thus obtained is supplied to an adder circuit 65, which adds the read address to the switching data obtained from the address control memory 66. The address control memory has the length of 63 memory locations, it is read cyclically in the manner described above, and it gives switching data to each time slot to be cross-connected. (This is the object of Finnish Patent Application No. 923297, filed Jul. 17, 1992, which corresponds to U.S. patent application Ser. No. 08/373,203, filed Mar. 10, 1995.

According to the invention, a relative read address is used as the switching data in the address control memory. This means that the switching data at each memory location indicates the relative transition of the data contained in the time slot within the frame structure. Each of the 63 address words has the length of 7 bits and indicates the difference within the frame structure between the incoming and outgoing time slot relating to the data in question. The relative address is positive if the signal leaves the time switch in a relatively earlier time slot and negative in the opposite case. (For example, at the second time slot the relative read address −1 indicates that the data of the first time slot is inserted in this time slot.)

A relative address can have (integer) values between −62 and +62, but not, however, in every time slot; each time slot has its own acceptable range within which the relative read address can be. The first time slot of each row of each frame block 42 can thus have only positive address values (from 0 to +62), the second time slot can have address values from −1 to +61, etc., and the last time slot can have only negative values and zero, i.e. address values from 0 to −62 (all of the above-mentioned lowest and highest values included). The addresses −63, −64 and +63 of the 7-bit address word, which are not yet in use, are reserved for other purposes.

The address control memory receives information on the phase of the frame from an output 67a of a phase identification circuit 67. A column flag CFLG, which provides information on when columns 1 to 12 are in progress in the frame, is obtained from another output 67b of the phase identification circuit 67. When this flag is valid, the output of the address control memory is forced to become zero, i.e. during these columns the adder circuit 65 is not given cross-connection data. On account of the relative address zero, the data in said columns passes "straight" through the switch (i.e. leaves the switch in the same time slot as it came in). The output of the adder circuit 65 has thus the value (WA−63), whereas each time slot of the blocks 42 has the value (WA−63+ relative read address), in which the relative read address is within a certain range depending on the time slot, as stated above. In addition, the contents of the address control memory must be interpreted at columns 13 to 18 (cf. the above table); i.e., it must be verified whether the switching instruction is reasonable. If other columns than columns 13 to 15 are addressed during these columns, the instruction is not reasonable, and a column relating to any TU-3 signal cannot be concerned. The same applies to columns 16 to 18 as well. If the switching instruction is not reasonable, the null pointer indicator NPI is generated into columns 13 to 15, and correspondingly fixed stuff into columns 16 to 18. If the instruction is a reasonable TU-3 level switching instruction, it may be part of a TU-3 or TU-2 switching instruction, or it may be a TU-12 switching instruction. The column in question can be switched in any case, for if a TU-2 or TU-12 signal is switched by a TU-3-type instruction, it is switched from an incoming TUG-3 unit, which in this case cannot contain a TU-3 signal. Therefore it does not matter if the location of the null pointer indicator should change.

Even though the invention has been described above with reference to the examples shown in the attached drawings, it is obvious that the invention is not restricted to them but may be modified in various ways within the inventive idea disclosed above and in the accompanying claims. Even though the invention has been described with reference to an SDH specific STM-1 signal, the solution of the invention can also be used in connection, with any time division multiplex signal.

REFERENCES

[1] CCITT Blue Book, Recommendation G.709: "Synchronous Multiplexing Structure", May 1990.

[2] SDH—Ny digital hierarki, TELE 2/90.

[3] CCITT Blue Book, Recommendation G.783: "Characteristics of Synchronous Digital Hierarchy (SDH) Multiplexing Equipment Functional Blocks," August 1990, Annex B.

We claim:

1. A method for implementing time switching in a synchronous digital hierarchy (SDH) network, comprising:

writing the contents of time slots of an incoming STM-1 signal into a memory at memory locations determined by a write address; and reading from said memory at memory locations indicated by switching data contained in an address control memory;

in frame blocks starting from columns 19, 82, 145 and 208 of the STM-1 frame, giving the switching data of each time slot as a relative address word indicating the location difference within the frame block between an outgoing time slot and an incoming time slot to be switched thereto and having a permitted value range of 63 address values within each column of the frame block;

during columns 1 to 12 of the STM-1 frame, forcing the relative address word to zero; and during columns 13 to 15 and 16 to 18, respectively, interpreting the switching data is in each column so as to find out which one of the columns the switching data addresses.

2. A method according to claim 1, comprising:

forming the read address relating to a respective said memory location by adding a respective said relative read address to a respective said write address from which a fixed delay is subtracted.

3. A method according to claim 2, comprising:

forcing a relative read address to become zero during time slots which are not cross-connected.

4. A time switch for implementing time switching in a synchronous digital hierarchy (SDH) network, in which the contents of time slots of an incoming STM-1 signal are written into a memory at memory locations determined by a write address, and read from said memory at memory locations indicated by switching data contained in an address control memory, for switching the contents of any time slot in the frame structure of an incoming STM-1 signal, to any time slot in the outgoing frame structure of an STM-1 signal, said time switch comprising:

a memory arranged to have written thereinto at respective addresses the contents of a succession of incoming time slots;

first means controlling writing into said memory and providing an indication of respective write addresses;

second means controlling reading from said memory, said second means comprising:

an address control memory, switching data of which, provided as an output thereof, indicates memory addresses of said memory from which data is to be read;

an adder circuit having connected as inputs thereto:

said indication of respective write addresses, from which a fixed delay has been subtracted, and said output of said address control memory, in the form of an address, which, in frame blocks starting from columns 19, 82, 145 and 208 of a respective STM-1 frame give switching data of each time slot of the frame block as a relative address consisting of the location difference, within the respective frame block, between an outgoing time slot and an incoming time slot to be switched thereto, said relative address having a permitted value range of 63 address values within each column of a respective said frame block; and means for forcing the output of the address control memory to zero during columns 1 to 12 of the respective STM-1 frame.

* * * * *